(12) United States Patent
Meuleau

(10) Patent No.: US 9,404,761 B2
(45) Date of Patent: *Aug. 2, 2016

(54) AUTONOMOUS VEHICLE LANE ROUTING AND NAVIGATION

(71) Applicant: Nissan North America, Inc., Franklin, TN (US)

(72) Inventor: Nicolas Meuleau, San Francisco, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/291,514

(22) Filed: May 30, 2014

(65) Prior Publication Data

US 2015/0345966 A1    Dec. 3, 2015

(51) Int. Cl.
  *G01C 22/00* (2006.01)
  *G01C 21/34* (2006.01)
(52) U.S. Cl.
  CPC ........ *G01C 21/3453* (2013.01); *G01C 21/3469* (2013.01)
(58) Field of Classification Search
  CPC .............................. H04W 4/00; B62D 15/0255
  USPC ........ 701/23, 117, 533, 25, 26, 416, 400, 414
  See application file for complete search history.

(56) References Cited

U.S. PATENT DOCUMENTS

| 5,229,941 A | 7/1993 | Hattori |
| 5,999,865 A | 12/1999 | Bloomquist et al. |
| 6,151,539 A | 11/2000 | Bergholz et al. |
| 7,765,038 B2 | 7/2010 | Appleby et al. |
| 8,452,483 B2 | 5/2013 | Kim et al. |
| 8,515,610 B2 | 8/2013 | Sung et al. |
| 9,096,267 B2 * | 8/2015 | Mudalige et al. |

(Continued)

FOREIGN PATENT DOCUMENTS

| WO | 2011154680 A1 | 12/2011 |
| WO | 2012160373 A3 | 11/2012 |

OTHER PUBLICATIONS

Montemerlo, Michael, et al.; "Junior: The Stanford Entry in the Urban Challenge", 2008, 31 pp.

(Continued)

*Primary Examiner* — Thomas G Black
*Assistant Examiner* — Luke Huynh
(74) *Attorney, Agent, or Firm* — Young Basile Hanlon & MacFarlane, P.C.

(57) ABSTRACT

A method and apparatus for autonomous vehicle lane routing and navigation are provided. Autonomous vehicle lane routing and navigation may include identifying vehicle transportation network information including road segment information and lane information, wherein the road segment information for at least one road segment from the plurality of road segments includes lane information representing at least two adjacent lanes, identifying an origin, identifying a destination, generating a plurality of candidate routes from the origin to the destination, wherein each route from the plurality of routes indicates a distinct combination of road segments and lanes, and wherein at least one candidate route from the plurality of candidate routes includes at least one of the adjacent lanes, identifying an optimal route from the plurality of candidate routes, the optimal route having a minimal route cost, and operating the autonomous vehicle to travel from the origin to the destination using the optimal route.

20 Claims, 6 Drawing Sheets

(56) References Cited

U.S. PATENT DOCUMENTS

2012/0233102 A1   9/2012  James
2013/0024060 A1*  1/2013  Sukkari et al. .................. 701/22
2013/0274986 A1  10/2013  Trepagnier et al.
2013/0311153 A1  11/2013  Moughler et al.

OTHER PUBLICATIONS

Boyan, Justin, et al; "Exact Solutions to Time-Dependent MDPs", NASA Ames Research Center, Computational Sciences Division, 2000, 6 pp.

Wei, Junqing, et al; "A Point-based MDP for Robust Single-Lane Autonomous Driving Behavior Under Uncertainties", Department of Electrical and Computer Engineering, Carnegie Mellon University, Pittsburgh, PA, May 2011, 7 pp.

DARPA Grand Challenge, "Urban Challenge: Route Network Definition File (RNDF) and Mission Data File (MDF) Formats", Mar. 14, 2007, Defense Advanced Research Projects Agency, 14 pp.

Ferguson, Dave, et al.; "A Reasoning Framework for Autonomous Urban Driving", 2008, 6 pp.

* cited by examiner

AUTONOMOUS VEHICLE LANE ROUTING AND NAVIGATION

TECHNICAL FIELD

This disclosure relates to autonomous vehicle routing and navigation.

BACKGROUND

An autonomous vehicle may be controlled autonomously, without direct human intervention, to traverse a route of travel from an origin to a destination. An autonomous vehicle may include a control system that may generate and maintain the route of travel and may control the autonomous vehicle to traverse the route of travel. Accordingly, a method and apparatus for autonomous vehicle lane routing and navigation may be advantageous.

SUMMARY

Disclosed herein are aspects, features, elements, implementations, and embodiments of autonomous vehicle lane routing and navigation.

An aspect of the disclosed embodiments is an autonomous vehicle for autonomous vehicle lane routing and navigation. The autonomous vehicle may include a processor configured to execute instructions stored on a non-transitory computer readable medium to identify vehicle transportation network information, the vehicle transportation network information including road segment information representing a plurality of road segments, the road segment information including lane information representing at least one lane for each respective road segment, wherein the road segment information for at least one road segment from the plurality of road segments includes lane information representing at least two adjacent lanes, identify an origin, identify a destination, generate a plurality of candidate routes from the origin to the destination based on the transportation network information, wherein each route from the plurality of routes indicates a distinct combination of road segments and lanes, and wherein at least one candidate route from the plurality of candidate routes includes at least one of the adjacent lanes, and identify an optimal route from the plurality of candidate routes, the optimal route having a minimal route cost. The autonomous vehicle may include a trajectory controller configured to operate the autonomous vehicle to travel from the origin to the destination using the optimal route.

Another aspect of the disclosed embodiments is an autonomous vehicle for autonomous vehicle lane routing and navigation. The autonomous vehicle may include a processor configured to execute instructions stored on a non-transitory computer readable medium to identify transportation network information, the transportation network information including road segment information representing a plurality of road segments, the road segment information including lane information representing at least one lane for each respective road segment, the lane information including waypoint information representing at least one waypoint for each respective lane, wherein the road segment information for at least one road segment from the plurality of road segments includes lane information representing at least two adjacent lanes, identify an origin, identify a destination, and generate a plurality of candidate routes from the origin to the destination based on the transportation network information, wherein each route from the plurality of routes indicates a distinct combination of road segments and lanes, and wherein at least one candidate route from the plurality of candidate routes includes at least one of the adjacent lanes. The processor may be configured to execute instructions stored on a non-transitory computer readable medium to, for at least one candidate route from the plurality of candidate routes, identify a first routing state, the first routing state including an indication of a first road segment, an indication of a first lane associated with the first road segment, and an indication of a first waypoint associated with the first lane, identify a second routing state, the second routing state including an indication of a second road segment, an indication of a second lane associated with the second road segment, and an indication of a second waypoint associated with the second lane such that the second waypoint is immediately adjacent to the first waypoint, and generate an action cost representing a cost to transition from the first routing state to the second routing state. The processor may be configured to execute instructions stored on a non-transitory computer readable medium to identify an optimal route from the plurality of candidate routes, the optimal route having a minimal route cost. The autonomous vehicle may include a trajectory controller unit configured to operate the autonomous vehicle to travel from the origin to the destination using the optimal route.

Another aspect of the disclosed embodiments is an autonomous vehicle for autonomous vehicle lane routing and navigation. The autonomous vehicle may include a processor configured to execute instructions stored on a non-transitory computer readable medium to identify transportation network information, the transportation network information including road segment information representing a plurality of road segments, the road segment information including lane information representing at least one lane for each respective road segment, the lane information including waypoint information representing at least one waypoint for each respective lane, wherein the road segment information for at least one road segment from the plurality of road segments includes lane information representing at least two adjacent lanes. The processor may be configured to execute instructions stored on a non-transitory computer readable medium to identify an origin, identify a destination, and generate a plurality of candidate routes from the origin to the destination based on the transportation network information, wherein each route from the plurality of routes indicates a distinct combination of road segments and lanes, and wherein at least one candidate route from the plurality of candidate routes includes at least one of the adjacent lanes. The processor may be configured to execute instructions stored on a non-transitory computer readable medium to, for at least one candidate route from the plurality of candidate routes, identify a first routing state, the first routing state including an indication of a first road segment, an indication of a first lane associated with the first road segment, and an indication of a first waypoint associated with the first lane, identify a second routing state, the second routing state including an indication of a second road segment, an indication of a second lane associated with the second road segment, and an indication of a second waypoint associated with the second lane such that the second waypoint is immediately adjacent to the first waypoint, identify a third routing state, the third routing state including an indication of a third road segment, an indication of a third lane associated with the third road segment, and an indication of a third waypoint associated with the third lane such that the third waypoint is immediately adjacent to the first waypoint, generate an action cost representing a cost to transition from the first routing state to the third routing state, generate an action cost representing a cost to transition from the first routing state to the second routing state, and select the minimal action cost from among the action cost representing the cost to transition from the first routing state to the second routing state and the action cost representing the cost to transition from the first routing state to the third routing state. The processor may be configured to execute instructions stored on a non-transitory computer readable medium to identify an optimal route from the plurality of candidate routes, the optimal route having a minimal route cost, based at least in part on the minimal action cost. The autonomous vehicle may include a trajectory controller unit configured to operate the autonomous vehicle to travel from the origin to the destination using the optimal route.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
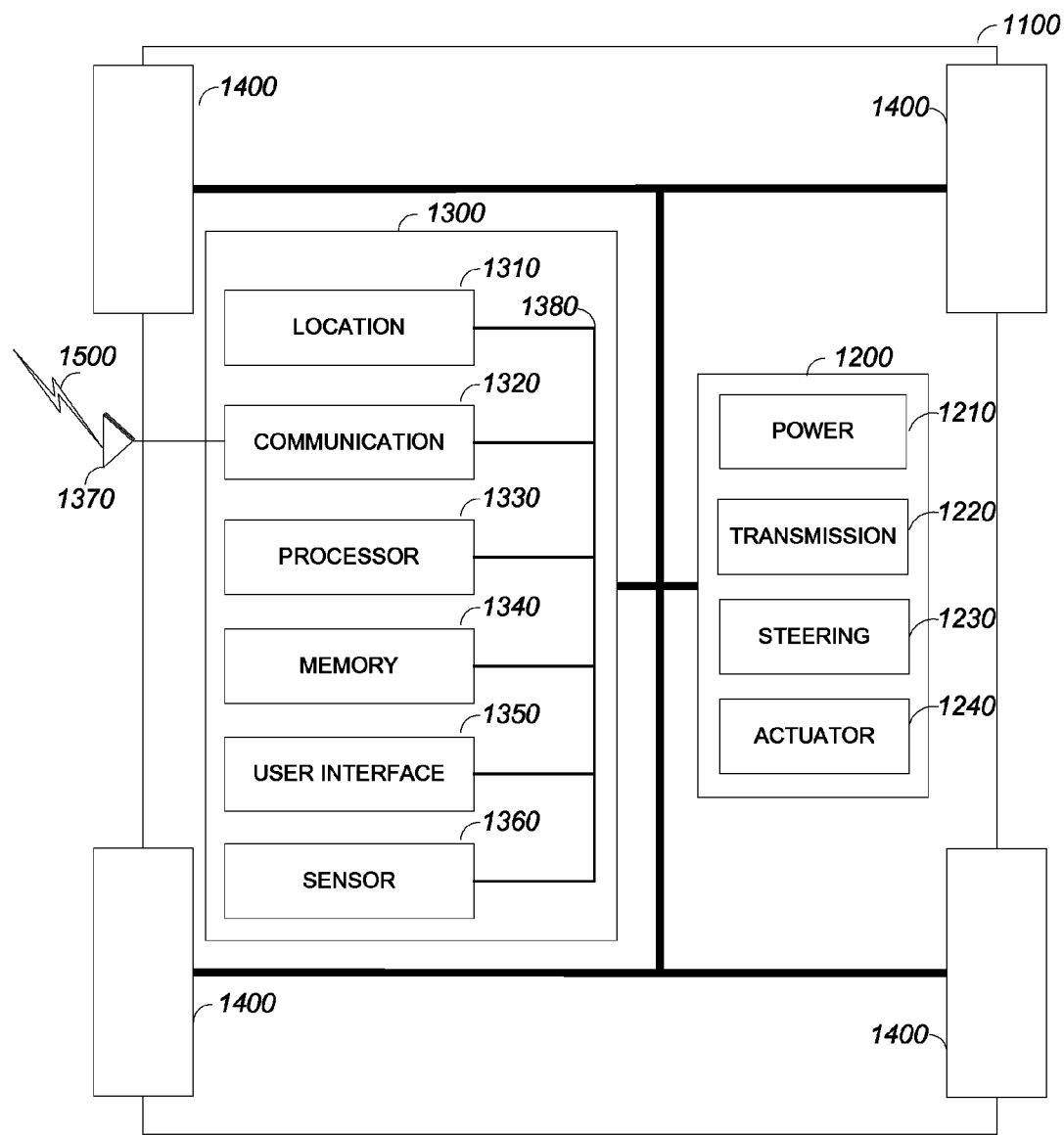
FIG. 1 is a diagram of an example of a portion of an autonomous vehicle in which the aspects, features, and elements disclosed herein may be implemented.

An autonomous vehicle may travel from a point of origin to a destination in a vehicle transportation network without human intervention. The autonomous vehicle may include a controller, which may perform autonomous vehicle routing and navigation. The controller may generate a route of travel from the origin to the destination based on vehicle information, environment information, vehicle transportation network information representing the vehicle transportation network, or a combination thereof. The controller may output the route of travel to a trajectory controller that may operate the vehicle to travel from the origin to the destination using the generated route.

In some embodiments, the vehicle transportation network information may represent the vehicle transportation network as a collection of interconnected roads having road segments and autonomous vehicle road routing and navigation may include generating a route based on the road and road segment information. However, the vehicle transportation network may include lanes not expressly represented by the vehicle transportation network information, and generating a route based on the road and road segment information may be inefficient.

In some embodiments, the vehicle transportation network information may represent the vehicle transportation network as a collection of interconnected roads having road segments and lanes, and autonomous vehicle lane routing and navigation may include generating a route based on the road information, road segment information, and lane information. In some embodiments, generating a route based on road information, road segment information, and lane information may produce a more efficient route than generating a route based on road information and road segment information.

The embodiments of the methods disclosed herein, or any part or parts thereof, including and aspects, features, elements thereof, may be implemented in a computer program, software, or firmware, or a portion thereof, incorporated in a tangible non-transitory computer-readable or computer-usable storage medium for execution by a general purpose or special purpose computer or processor.

As used herein, the terminology "computer" or "computing device" includes any unit, or combination of units, capable of performing any method, or any portion or portions thereof, disclosed herein.

As used herein, the terminology "processor" indicates one or more processors, such as one or more general purpose processors, one or more special purpose processors, one or more conventional processors, one or more digital signal processors, one or more microprocessors, one or more controllers, one or more microcontrollers, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of an autonomous vehicle in which the aspects, features, and elements disclosed herein may be implemented. In some embodiments, an autonomous vehicle 1000 may include a chassis 1100, a powertrain 1200, a controller 1300, wheels 1400, or any other element or combination of elements of an autonomous vehicle. Although the autonomous vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the autonomous vehicle 1000, which may include accelerating, decelerating, steering, or otherwise controlling the autonomous vehicle 1000.

The powertrain 1200 may include a power source 1210, a transmission 1220, a steering unit 1230, an actuator 1240, or any other element or combination of elements of a powertrain, such as a suspension, a drive shaft, axels, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1400 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the control unit 1300 the actuator 1240 or both. The steering unit 1230 may be controlled by the control unit 1300 the actuator 1240 or both and may control the wheels 1400 to steer the autonomous vehicle. The vehicle actuator 1240 may receive signals from the controller 1300 and may actuate or control the power source 1210, the transmission 1220, the steering unit 1230, or any combination thereof to operate the autonomous vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more general purpose processors, one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, an autonomous vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the autonomous vehicle 1000. For example, the location unit may include a global positioning system (GPS) unit, a radio triangulation unit, or a combination thereof. The location unit 1310 can be used to obtain information that represents, for example, a current heading of the autonomous vehicle 1000, a current position of the autonomous vehicle 1000 in two or three dimensions, a current angular orientation of the autonomous vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person.

The sensor 1360 may include one or more sensors, such as an array of sensors, which may be operable to provide information that may be used to control the autonomous vehicle. The sensors 1360 may provide information regarding current operating characteristics of the vehicle. The sensors 1360 can include, for example, a speed sensor, acceleration sensors, a steering angle sensor, traction-related sensors, braking-related sensors, or any sensor, or combination of sensors, that is operable to report information regarding some aspect of the current dynamic situation of the autonomous vehicle 1000.

In some embodiments, the sensors 1360 may include sensors that are operable to obtain information regarding the physical environment surrounding the autonomous vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the autonomous vehicle 1000 may include a trajectory controller. For example, the controller 1300 may include the trajectory controller. The trajectory controller may be operable to obtain information describing a current state of the autonomous vehicle 1000 and a rout planned for the autonomous vehicle 1000, and, based on this information, to determine and optimize a trajectory for the autonomous vehicle 1000. In some embodiments, the trajectory controller may output signals operable to control the autonomous vehicle 1000 such that the autonomous vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the autonomous vehicle 1000 under control of the transmission 1220, or a steered and propelled wheel that may steer and propel the autonomous vehicle 1000.

Although not shown in FIG. 1, an autonomous vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
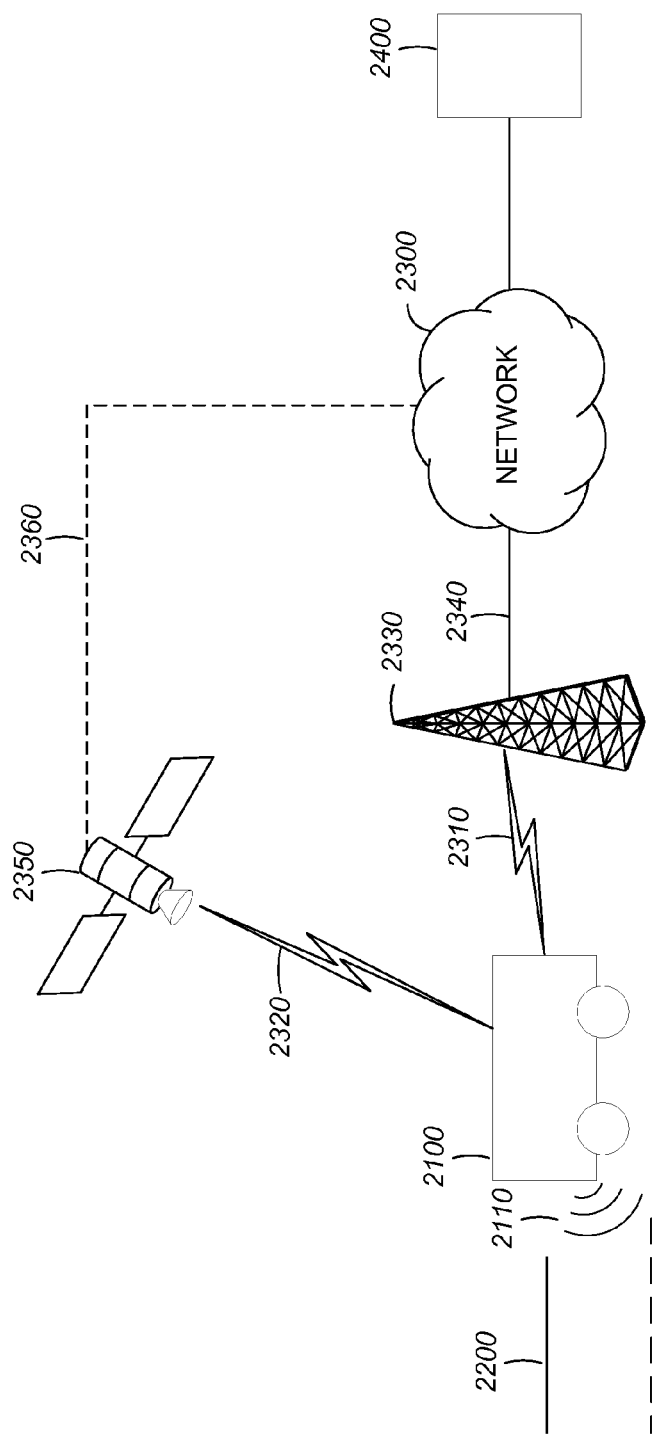
FIG. 2 is a diagram of an example of a portion of an autonomous vehicle transportation and communication system in which the aspects, features, and elements disclosed herein may be implemented.

FIG. 2 is a diagram of an example of a portion of an autonomous vehicle transportation and communication system in which the aspects, features, and elements disclosed herein may be implemented. The autonomous vehicle transportation and communication system 2000 may include one or more autonomous vehicles 2100, such as the autonomous vehicle 1000 shown in FIG. 1, which may travel via one or more portions of one or more vehicle transportation networks 2200, and may communicate via one or more electronic communication networks 2300. Although not explicitly shown in FIG. 2, an autonomous vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the autonomous vehicle 2100 and one or more communicating devices 2400. For example, an autonomous vehicle 2100 may receive information, such as information representing the vehicle transportation network 2200, from a communicating device 2400 via the network 2300.

In some embodiments, an autonomous vehicle 2100 may communicate via a wired communication link (not shown), a wireless communication link 2310/2320, or a combination of any number of wired or wireless communication links. For example, as shown, an autonomous vehicle 2100 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, the autonomous vehicle 2100 may communicate with the communications network 2300 via an access point 2330. An access point 2330, which may include a computing device, may be configured to communicate with an autonomous vehicle 2100, with a communication network 2300, with one or more communicating devices 2400, or with a combination thereof, via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the autonomous vehicle 2100 may communicate with the communications network 2300 via a satellite 2350, or other non-terrestrial communication device. A satellite 2350, which may include a computing device, may be configured to communicate with an autonomous vehicle 2100, with a communication network 2300, with one or more communicating devices 2400, or with a combination thereof, via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, an autonomous vehicle 2100 may identify a portion or condition of the vehicle transportation network 2200. For example, the autonomous vehicle may include one or more on-vehicle sensors 2110, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, an autonomous vehicle 2100 may traverse a portion or portions of one or more vehicle transportation networks 2200 using information communicated via the network 2300, such as information representing the vehicle transportation network 2200, information identified by one or more on-vehicle sensors 2110, or a combination thereof.

Although, for simplicity, FIG. 2 shows one autonomous vehicle 2100, one vehicle transportation network 2200, one electronic communication network 2300, and one communicating device 2400, any number of autonomous vehicles, networks, or computing devices may be used. In some embodiments, the autonomous vehicle transportation and communication system 2000 may include devices, units, or elements not shown in FIG. 2. Although the autonomous vehicle 2100 is shown as a single unit, an autonomous vehicle may include any number of interconnected elements.

Figure 3:
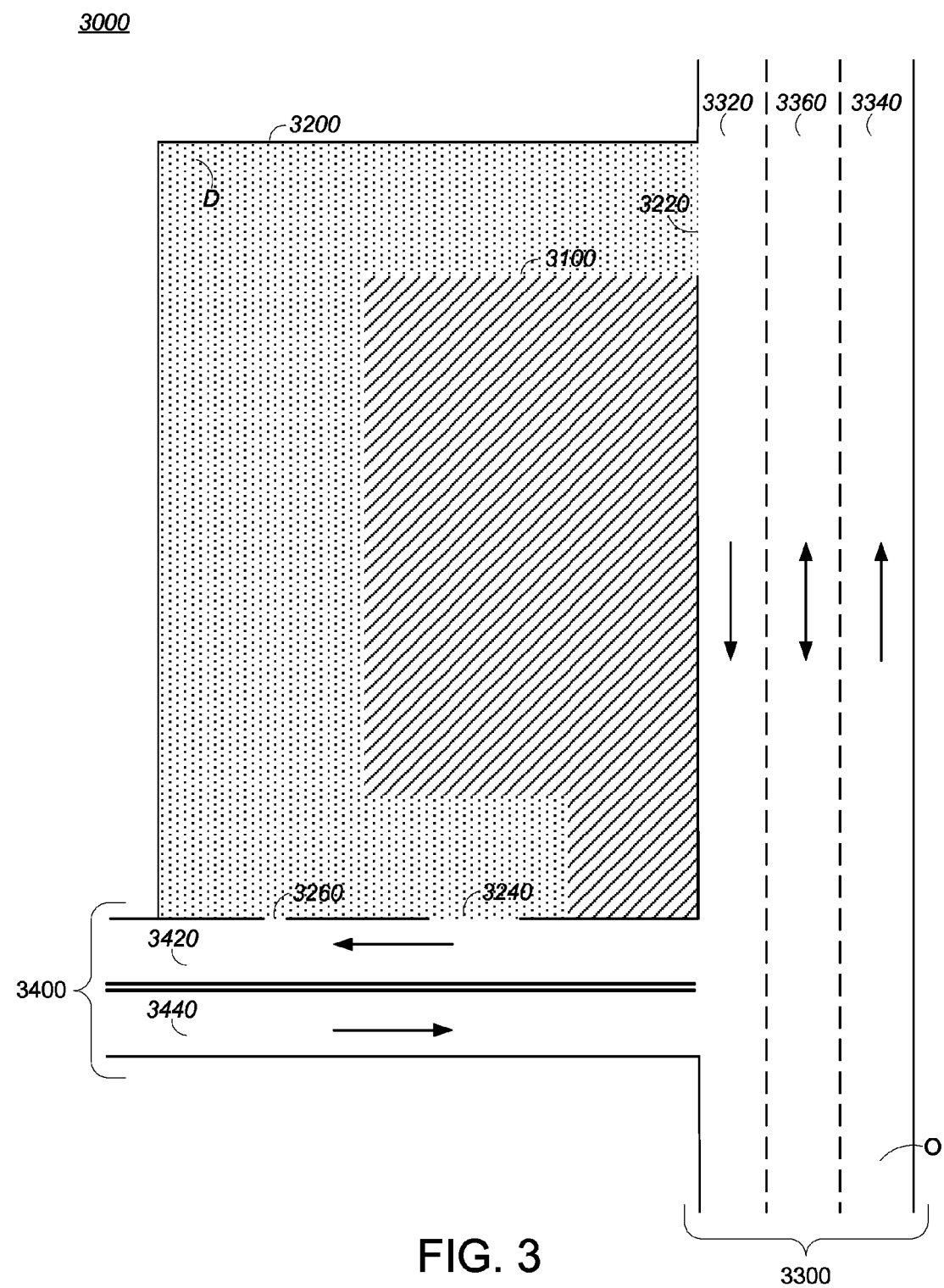
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more navigable areas, such as parking area 3200 or roads 3300/3400, or a combination thereof. In some embodiments, an autonomous vehicle, such as the autonomous vehicle 1000 shown in FIG. 1 or the autonomous vehicle 2100 shown in FIG. 2, may traverse a portion or portions of the vehicle transportation network 3000. For example, an autonomous vehicle may travel from an origin O to a destination D.

The vehicle transportation network may include one or more interchanges 3220/3240/3260 between one or more navigable areas 3200/3300/3400. For example, the portion of the vehicle transportation network shown in FIG. 3 includes an interchange 3220 between the parking area 3200 and road 3300 and two interchanges 3240/3260 between the parking area 3200 and road 3400.

A portion of the vehicle transportation network, such as a road 3300/3400 may include one or more lanes 3320/3340/3360/3420/3440, and may be associated with one or more directions of travel, which are indicated by arrows in FIG. 3.

Figure 4:
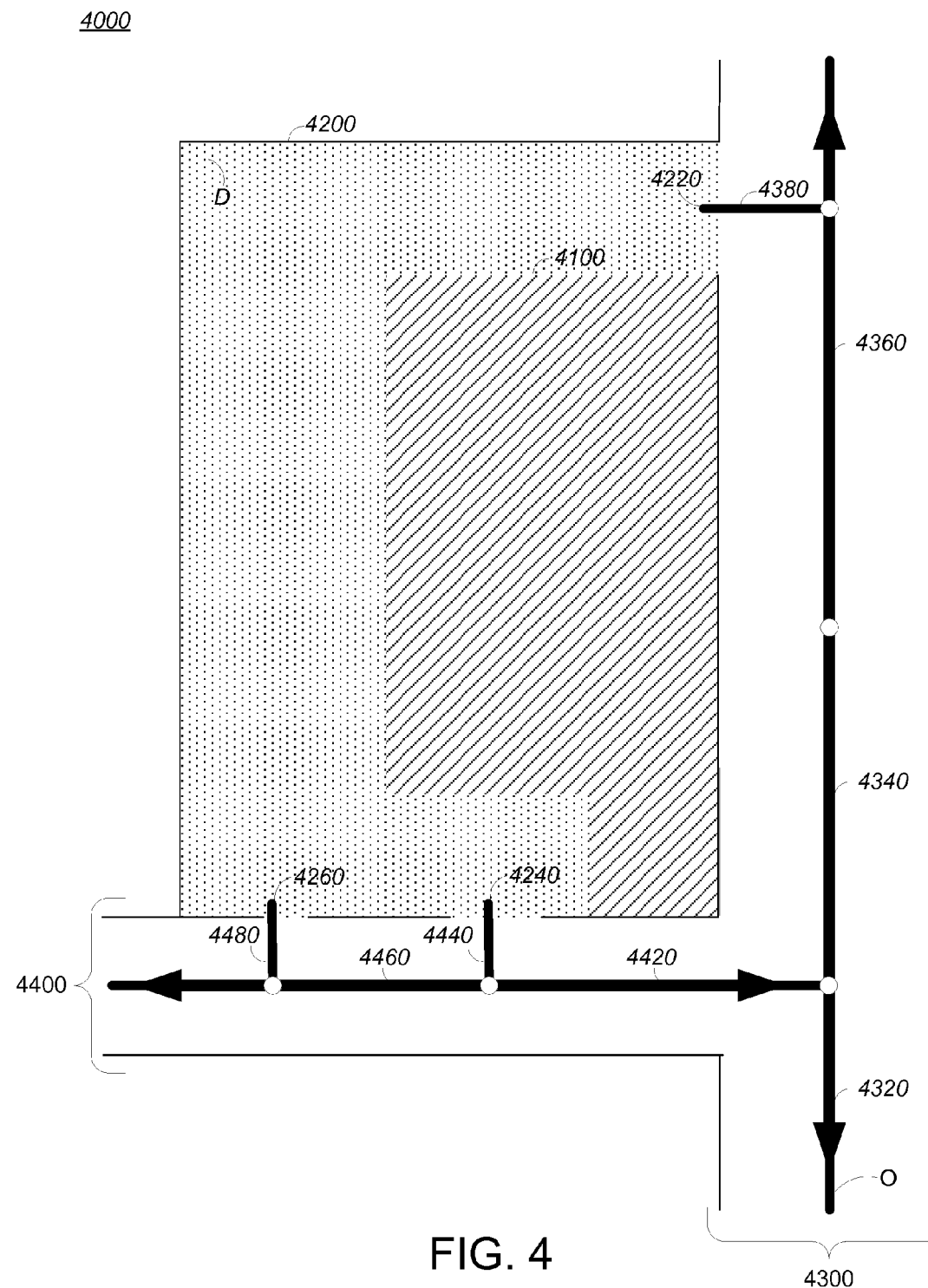
FIG. 4 is a diagram of a portion of a map representing road segments in accordance with this disclosure.
Figure 5:
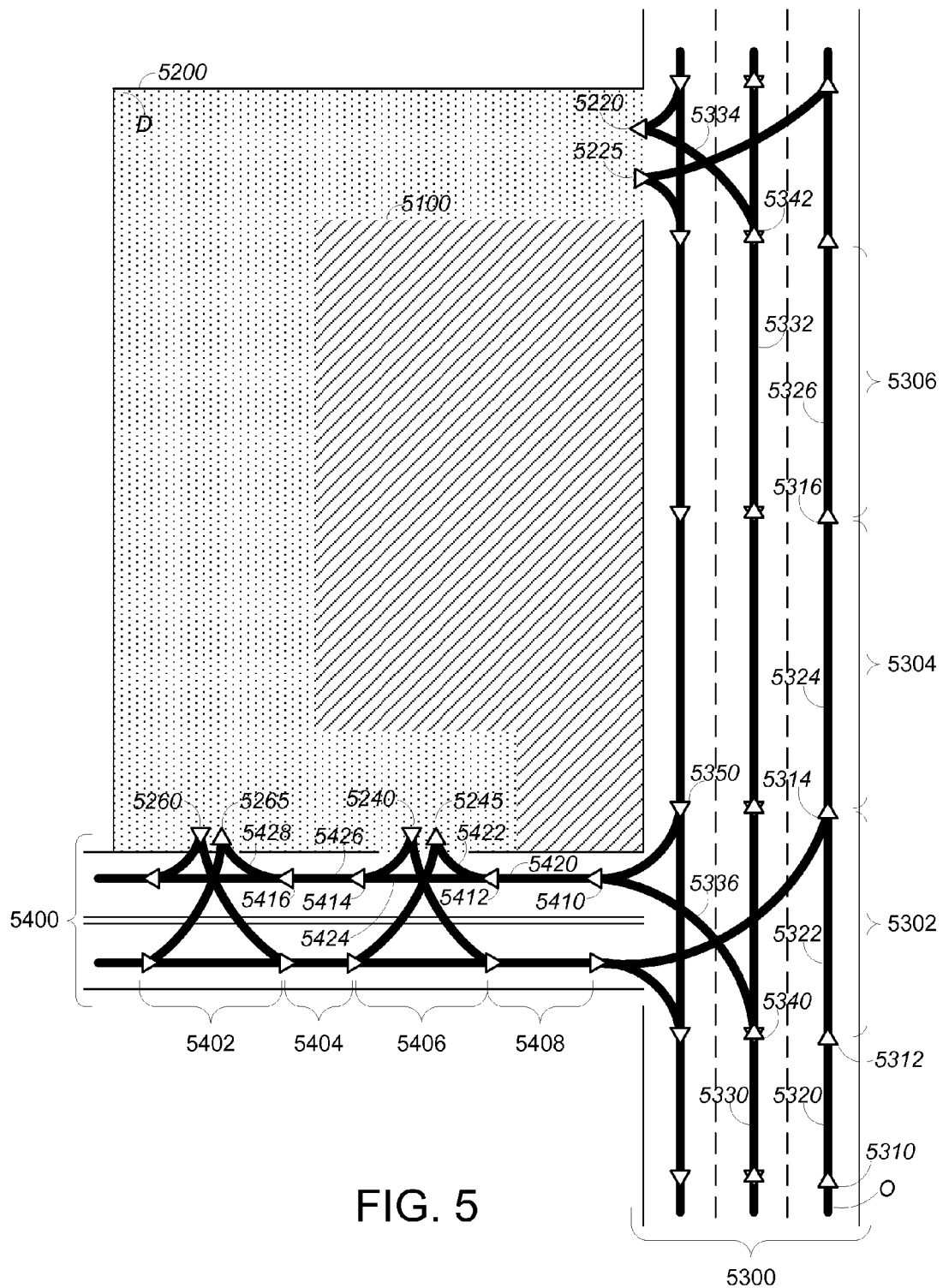
FIG. 5 is a diagram of a portion of a map representing lanes in accordance with this disclosure.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, FIGS. 4 and 5 depict vehicle transportation network information representing the portion of vehicle transportation network shown in FIG. 3 as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

FIG. 4 is a diagram of vehicle transportation network information including road segments representing a portion of a vehicle transportation network in accordance with this disclosure. In some embodiments, the vehicle transportation network information 4000 may include road segment information. For example, the vehicle transportation network information may include non-navigable area information 4100, navigable non-road area information 4200, road information 4300/4400, which may represent a roads 3300/3400 shown in FIG. 3, and may include road segment information 4320-4480 indicating road segments of road 4300 and road 4400. The vehicle transportation network information may include interchange information 4220/4240/4260 representing interchanges between navigable areas, such as the interchanges 3220/3240/3260 shown in FIG. 3.

In some embodiments, an autonomous vehicle, such as the autonomous vehicle 1000 shown in FIG. 1 or the autonomous vehicle 2100 shown in FIG. 2, may generate a route for traversing a portion of a vehicle transportation network based on the vehicle transportation network information 4000 and may traverse the vehicle transportation network based on the generated route. For example, an autonomous vehicle may generate a route from the origin O to the destination D based on the vehicle transportation network information 4000 and may travel from the origin O to the destination D using the generated route.

FIG. 5 is a diagram of vehicle transportation network information including lanes representing a portion of a vehicle transportation network in accordance with this disclosure. In some embodiments, the vehicle transportation network information 5000 may include non-navigable area information 5100, navigable non-road area information 5200, road information 5300/5400, road segment information 5302-5306/5402-5408, lane information 5320-5326/5330-5336/5420-5428, waypoint information 5310-5316/5340-5342/5350/5410-5416, interchange information 5220-5265, or a combination thereof. For example, the vehicle transportation network information 5000 may be expressed as a hierarchy and the road information may include the road segment information, which may include the lane information.

The road information 5300/5400 may represent roads, such as the roads 3300/3400 of the vehicle transportation network 3000 shown in FIG. 3. The road segment information 5302-5306/5402-5408 may represent segments or portions of the roads. The lane information 5320-5326/5330-5336/5420-5428 may represent lanes of the roads. The waypoint information 5310-5316/5340-5342/5350/5410-5416 may represent a location, point, or state within a lane of a road segment of a road or between contiguous portions of the vehicle transportation network, such as between a lane of a first road segment and a contiguous lane in a second road segment. The lane interchange information 5220-5265 may represent interchanges between roads and other navigable areas of the vehicle transportation network, such as between a lane and a non-road navigable area.

In some embodiments, the vehicle transportation network information 5000 may include direction of travel information indicating one or more directions of travel associated with a lane or waypoint. For simplicity, in FIG. 5 the waypoints are shown as triangles pointing in the direction of travel. For example, waypoints 5310-5316 indicate that the corresponding lanes are associate with a first direction of travel, waypoint 5350 indicates that the corresponding lanes are associate with a second direction of travel, opposite the first direction of travel, and waypoints 5340-5342 indicate that the corresponding lanes are associate with both the first direction of travel and the second direction of travel.

In some embodiments, a waypoint 5310-5316/5340-5342/5350/5410-5416 may represent a routing decision point, state, or action point and autonomous vehicle lane routing and navigation may include making a decision or determining an action to perform for one or more of the waypoints 5310-5316/5340-5342/5350/5410-5416. For example, generating a route including waypoint 5350 may include determining whether to continue forward in a lane of road 5300 or to turn right onto a lane of road 5400.

In some embodiments, an autonomous vehicle, such as the autonomous vehicle 1000 shown in FIG. 1 or the autonomous vehicle 2100 shown in FIG. 2, may generate a route for traversing a portion of a vehicle transportation network based on the vehicle transportation network information 5000 and may traverse the vehicle transportation network based on the generated route. For example, an autonomous vehicle may generate a route from the origin O to the destination D based on the vehicle transportation network information 5000 and may travel from the origin to the destination using the generated route.

Although a limited number of non-navigable areas, non-road navigable areas, roads, road segments, lanes, waypoints, and interchanges are shown in FIG. 5 for simplicity, the vehicle transportation network information may include any number of non-navigable areas, non-road navigable areas, roads, road segments, lanes, waypoints, and interchanges.

Figure 6:
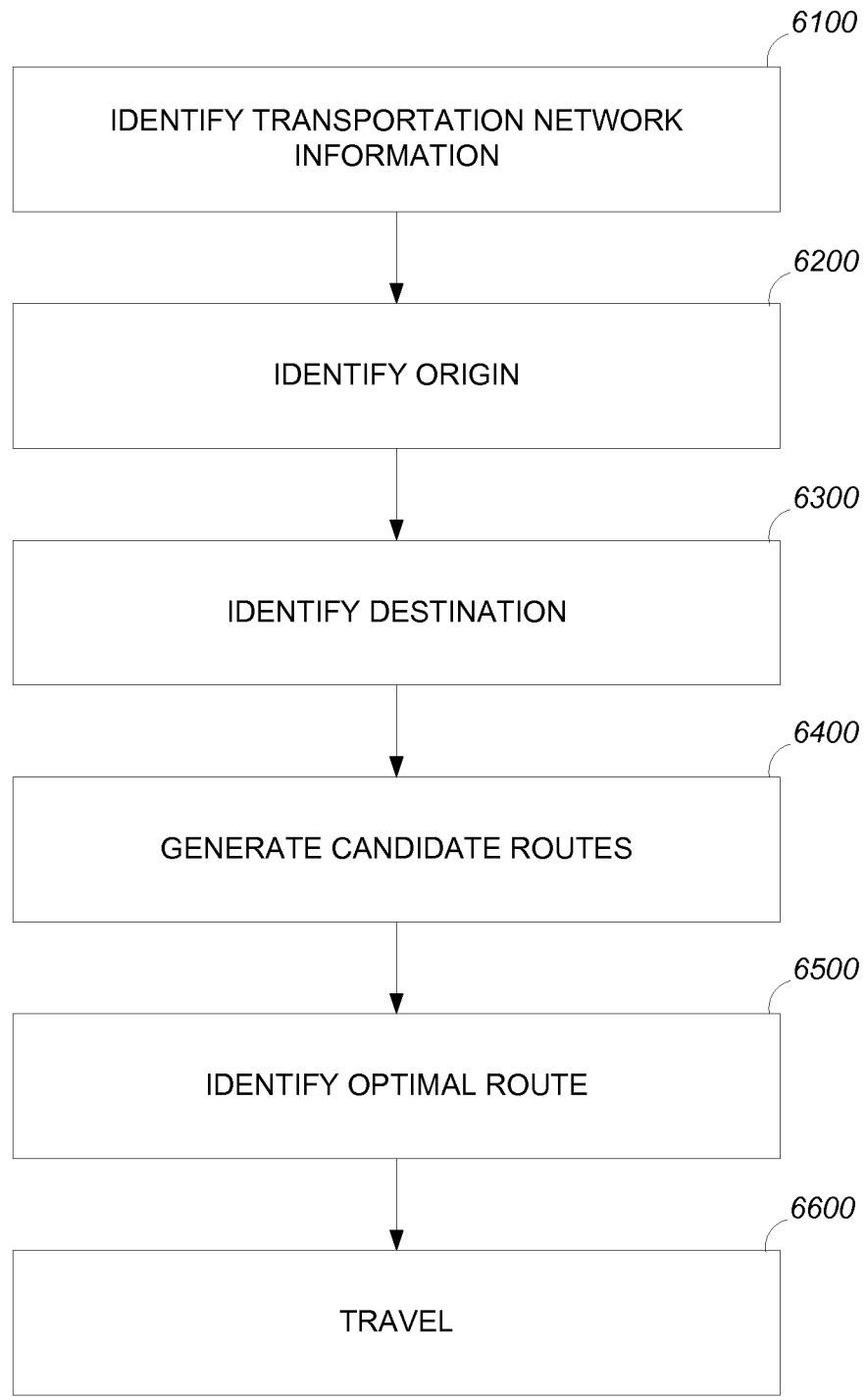
FIG. 6 is a diagram of a method of autonomous vehicle lane routing and navigation in accordance with this disclosure.

FIG. 6 is a diagram of a method of autonomous vehicle lane routing and navigation in accordance with this disclosure. Autonomous vehicle lane routing and navigation may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform autonomous vehicle lane routing and navigation. Implementations of autonomous vehicle lane routing and navigation may include identifying vehicle transportation network information at 6100, identifying an origin at 6200, identifying a destination at 6300, generating candidate routes at 6400, identifying an optimal route at 6500, traveling at 6600, or a combination thereof.

In some embodiments, vehicle transportation network information, such as the vehicle transportation network information shown in FIG. 4 or the vehicle transportation network information shown in FIG. 5, may be identified at 6100. For example, an autonomous vehicle control unit, such as the controller 1300 shown in FIG. 1, may read the vehicle transportation network information from a data storage unit, such as the memory 1340 shown in FIG. 1, or may receive the vehicle transportation network information from an external data source, such as the communicating device 2400 shown in FIG. 2, via an electronic communication system, such as the electronic communication network 2300 shown in FIG. 2.

In some embodiments, identifying the vehicle transportation network information may include transcoding or reformatting the vehicle transportation network information, storing the reformatted vehicle transportation network information, or both.

In some embodiments, an origin may be identified at 6200. For example, the origin may indicate a target starting point, such as a current location of the autonomous vehicle. In some embodiments, identifying the origin may include controlling a location unit, such as the location unit 1310 shown in FIG. 1, to determine a current geographic location of the autonomous vehicle. In some embodiments, identifying the origin at 6200 may include identifying vehicle transportation network information corresponding to the origin. For example, identifying the origin may include identifying a road, road segment, lane, waypoint, or a combination thereof. In some embodiments, the current location of the autonomous vehicle may be a navigable non-road area or an area that is not expressly or completely included in a vehicle transportation network, such as an off-road area, and identifying the origin may include identifying a road, road segment, lane, waypoint, or combination thereof, near, or proximal to, the current location of the autonomous vehicle.

In some embodiments, a destination may be identified at 6300. In some embodiments, identifying the destination at 6300 may include identifying vehicle transportation network information representing a target location within the vehicle transportation network. For example, identifying the destination may include identifying a road, road segment, lane, waypoint, or combination thereof, in the vehicle transportation network information. In some embodiments, the target location may be a navigable non-road area or an area that is not expressly or completely included in a vehicle transportation network, such as an off-road area, and identifying the destination may include identifying a road, road segment, lane, waypoint, or combination thereof, near, or proximal to, the target destination location.

In some embodiments, candidate routes from the origin to the destination may be generated at 6400. For example, the candidate routes may be generated based on the vehicle transportation network information identified at 6100, the origin identified at 6200, and the destination identified at 6300. In some embodiments, a candidate route may represent a unique or distinct route from the origin to the destination. For example, a candidate route may include a unique or distinct combination of roads, road segments, lanes, waypoints, and interchanges.

In an example based on the vehicle transportation network information 4000 shown in FIG. 4, an autonomous vehicle may generate candidate routes from the origin O to the destination D based on the vehicle transportation network information 4000. A first candidate route may include road segment 4320, road segment 4340, road segment 4360, road segment 4380, and interchange 4220. The first candidate route may indicate that the autonomous vehicle may traverse, in sequence, the road segments represented by road segment information 4320, 4340, and 4360, may turn left and traverse road segment 4380 to interchange 4220, and may traverse the navigable non-road area 4200 to arrive at the destination D. A second candidate route may include road segment 4320, road segment 4420, road segment 4440, and interchange 4240. The second candidate route may indicate that the autonomous vehicle may traverse the road segment represented by road segment information 4320, may turn left and traverse the road segments represented by road segment information 4420, may turn right and traverse the road segments represented by road segment information 4440 to interchange 4240, and may traverse the navigable non-road area to arrive at the destination D. A third candidate route may include road segment 4320, road segment 4420, road segment 4460, road segment 4480, and interchange 4260. The third candidate route may indicate that the autonomous vehicle may traverse the road segment represented by road segment information 4320, may turn left and traverse the road segments represented by road segment information 4420 and 4460, may turn right and traverse the road segments represented by road segment information 4480 to interchange 4260, and may traverse the navigable non-road area to arrive at the destination D.

In an example based on the vehicle transportation network information 5000 shown in FIG. 5, an autonomous vehicle may generate candidate routes from the origin O to the destination D based on the vehicle transportation network information 5000. A first candidate route may include waypoint 5310, lane 5320, waypoint 5312, lane 5322, waypoint 5314, lane 5324, waypoint 5316, lane 5326, lane 5332, waypoint 5342, lane 5334, and interchange 5220. The first candidate route may indicate that the autonomous vehicle may traverse from waypoint 5310 to waypoint 5312 via lane 5320, from waypoint 5312 to waypoint 5314 via lane 5322, from waypoint 5314 to waypoint 5316 via lane 5324, from waypoint 5316 to waypoint 5342 via lanes 5326 and 5332, which may include changing lanes from lane 5326 to adjacent lane 5332, from waypoint 5342 to interchange 5220 via lane 5334, and from interchange 5220 to the destination via the non-road navigable area 5200. A second candidate route may include waypoint 5310, lane 5320, lane 5330, waypoint 5340, lane 5336, waypoint 5410, lane 5420, waypoint 5412, lane 5422, and interchange 5245. The second candidate route may indicate that the autonomous vehicle may traverse from waypoint 5310 to waypoint 5340 via lanes 5320 and 5330, which may include changing lanes from lane 5320 to adjacent lane 5330, from waypoint 5340 to waypoint 5410 via lane 5336, from waypoint 5410 to waypoint 5412 via lane 5420, from waypoint 5412 to interchange 5245 via lane 5422, and from interchange 5245 to the destination via the non-road navigable area 5200. A third candidate route may include waypoint 5310, lane 5320, lane 5330, waypoint 5340, lane 5336, waypoint 5410, lane 5420, waypoint 5412, lane 5424, waypoint 5414, lane 5426, waypoint 5416, lane 5428, and interchange 5265. The third candidate route may indicate that the autonomous vehicle may traverse from waypoint 5310 to waypoint 5340 via lanes 5320 and 5330, which may include changing lanes from lane 5320 to adjacent lane 5330, from waypoint 5340 to waypoint 5410 via lane 5336, from waypoint 5410 to waypoint 5412 via lane 5420, from waypoint 5412 to waypoint 5414 via lane 5424, from waypoint 5414 to waypoint 5416 via lane 5426, from waypoint 5416 to interchange 5265 via lane 5428, and from interchange 5265 to the destination via the non-road navigable area 5200.

In some embodiments, an optimal route may be identified at 6500. Identifying the optimal route may include selecting a candidate route from the candidate routes generated at 6400. For example, a candidate route having a minimal route cost may be identified as the optimal route. In some embodiments, identifying the optimal route from the candidate routes may include determining a route cost for each candidate route. In some embodiments, identifying the optimal route may include using a discrete time stochastic control process, such as a Markov decision process.

In some embodiments, identifying the optimal route may include identifying a routing state corresponding to each waypoint in a candidate route. For example, a first routing state may indicate a road, a road segment, a lane, a waypoint, or a combination thereof, in a first candidate route, and a second routing state may indicate the road, the road segment, the lane, the waypoint, or the combination thereof, in a second candidate route.

In some embodiments, autonomous vehicle routing and navigation may include evaluating the expected action costs for performing an action, such as transitioning from one routing state to another, which may correspond with transitioning from one waypoint to another, and may represent the expected cost of the autonomous vehicle traveling from one location, represented by the first waypoint, to another location, represented by the second waypoint, during execution of the route. In some embodiments, an action may indicate a transition from a routing state to an immediately adjacent routing state, which may correspond with transitioning from a waypoint to an immediately adjacent waypoint without intersecting another waypoint, and may represent an autonomous vehicle traveling from a location, represented by the first waypoint, to another location, represented by the immediately adjacent waypoint.

In some embodiments, an action cost may be determined based on the vehicle transportation network information. For example, within a candidate route, a first routing state may correspond with a first waypoint, such as waypoint 5412 shown in FIG. 5, which may correspond with a first location in the vehicle transportation network shown in FIG. 3, a second routing state may correspond with a second waypoint, such as waypoint 5424 shown in FIG. 5, which may correspond with second location in the vehicle transportation network shown in FIG. 3, and the action cost may represent an estimated, predicted, or expected cost for the autonomous vehicle to travel from the first location to the second location.

In some embodiments, determining the action cost may include evaluating cost metrics, such as a distance cost metric, a duration cost metric, a fuel cost metric, an acceptability cost metric, or a combination thereof. In some embodiments, the cost metrics may be determined dynamically or may be generated, stored, and accessed from memory, such as in a database. In some embodiments, determining the action cost may include calculating a cost function based on one or more of the metrics. For example, the cost function may be minimizing with respect to the distance cost metric, minimizing with respect to the duration cost metric, minimizing with respect to the fuel cost metric, and maximizing with respect to the acceptability cost metric.

A distance cost metric may represent a distance from a first location represented by a first waypoint corresponding to a first routing state to a second location represented by a second waypoint corresponding to a second routing state.

A duration cost metric may represent a predicted duration for traveling from a first location represented by a first waypoint corresponding to a first routing state, to a second location represented by a second waypoint corresponding to a second routing state, and may be based on condition information for the autonomous vehicle and the vehicle transportation network, which may include fuel efficiency information, expected initial speed information, expected average speed information, expected final speed information, road surface information, or any other information relevant to travel duration.

A fuel cost metric may represent a predicted fuel utilization to transition from a first routing state to a second routing state, and may be based on condition information for the autonomous vehicle and the vehicle transportation network, which may include fuel efficiency information, expected initial speed information, expected average speed information, expected final speed information, road surface information, or any other information relevant to fuel cost.

An acceptability cost metric may represent a predicted acceptability for traveling from a first location represented by a first waypoint corresponding to a first routing state to a second location represented by a second waypoint corresponding to a second routing state, and may be based on condition information for the autonomous vehicle and the vehicle transportation network, which may include expected initial speed information, expected average speed information, expected final speed information, road surface information, aesthetic information, toll information, or any other information relevant to travel acceptability. In some embodiments, the acceptability cost metric may be based on acceptability factors. In some embodiments, an acceptability factor may indicate that a location, which may include a specified road or area, such as an industrial area, or a road type, such as a dirt road or a toll road, has a low or negative acceptability, or an acceptability factor may indicate that a location, such as road having a scenic view, has a high or positive acceptability factor.

In some embodiments, evaluating the cost metrics may include weighting the cost metrics and calculating the action cost based on the weighted cost metrics. Weighting a cost metric may include identifying a weighting factor associated with the cost metric. For example, identifying a weighting factor may include accessing a record indicating the weighting factor and an association between the weighting factor and the cost metric. In some embodiments, weighting a cost metric may include generating a weighted cost metric based on the weighting factor and the cost metric. For example, a weighted cost metric may be a product of the weighting factor and the cost metric. In some embodiments, estimating the action cost may include calculating a sum of cost metrics, or a sum of weighted cost metrics.

In some embodiments, identifying the optimal route may include selecting the minimum action cost from among an action cost for transitioning from a first routing state to a second routing state with an action cost for transitioning from the first routing state to a third routing state. In some embodiments, identifying the optimal route may include generating a route cost for a candidate route as the sum of the action costs for each action in the route. In some embodiments, identifying the optimal route may include generating a route cost for each candidate route and selecting the candidate route with the lowest, or minimum, route cost as the optimal route.

In some embodiments, the controller may output or store the candidate routes, the optimal route, or both. For example, the controller may store the candidate routes and the optimal route and may output the optimal route to a trajectory controller, vehicle actuator, or a combination thereof, to operate the autonomous vehicle to travel from the origin to the destination using the optimal route In some embodiments, the autonomous vehicle may travel from the origin to the destination using the optimal route at 6600. For example, the autonomous vehicle may include a vehicle actuator, such as the actuator 1240 shown in FIG. 1, and vehicle actuator may operate the autonomous vehicle to travel from the origin to the destination using the optimal route. In some embodiments, the autonomous vehicle may include a trajectory controller and the trajectory controller may operate the autonomous vehicle to travel based on the optimal route and current operating characteristics of the autonomous vehicle, and then physical environment surrounding the autonomous vehicle.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An autonomous vehicle comprising:
 a processor configured to execute instructions stored on a non-transitory computer readable medium to:
  identify vehicle transportation network information, the vehicle transportation network information including road segment information representing a plurality of road segments, the road segment information including lane information representing at least one lane for each respective road segment, wherein the road segment information for at least one road segment from the plurality of road segments includes lane information representing at least two adjacent lanes,
  identify an origin,
  identify a destination,
  generate a plurality of candidate routes from the origin to the destination based on the transportation network information, wherein each route from the plurality of routes indicates a distinct combination of road segments and lanes, and wherein at least one candidate route from the plurality of candidate routes includes at least one of the adjacent lanes, and
  identify an optimal route from the plurality of candidate routes, the optimal route having a minimal route cost; and
 a trajectory controller configured to operate the autonomous vehicle to travel from the origin to the destination using the optimal route.

2. The autonomous vehicle of claim 1, wherein the processor is configured to execute instructions stored on the non-transitory computer readable medium to:
 identify the optimal route using a Markov decision process.

3. The autonomous vehicle of claim 1, wherein the processor is configured to execute instructions stored on the non-transitory computer readable medium to:
 identify the optimal route using a discrete time stochastic control process.

4. The autonomous vehicle of claim 1, wherein the lane information includes waypoint information representing at least one waypoint for each respective lane, and wherein the processor is configured to execute instructions stored on the non-transitory computer readable medium to identify the optimal route by:
 identifying a first routing state, the first routing state including an indication of a first road segment, an indication of a first lane associated with the first road segment, and an indication of a first waypoint associated with the first lane;
 identifying a second routing state, the second routing state including an indication of a second road segment, an indication of a second lane associated with the second road segment, and an indication of a second waypoint associated with the second lane such that the second waypoint is immediately adjacent to the first waypoint; and
 estimating an action cost representing a cost to transition from the first routing state to the second routing state.

5. The autonomous vehicle of claim 4, wherein estimating the action cost includes evaluating at least one of a plurality of cost metrics.

6. The autonomous vehicle of claim 5, wherein the plurality of cost metrics includes at least one of a distance cost metric, a duration cost metric, a fuel cost metric, or an acceptability cost metric.

7. The autonomous vehicle of claim 6, wherein estimating the action cost includes calculating a cost function that is minimizing with respect to the distance cost metric, minimizing with respect to the duration cost metric, minimizing with respect to the fuel cost metric, and maximizing with respect to the acceptability cost metric.

8. The autonomous vehicle of claim 5, wherein estimating the action cost includes identifying a weighting factor associated with each respective cost metric from the plurality of cost metrics.

9. The autonomous vehicle of claim 5, wherein estimating the action cost includes generating a plurality of weighted cost metrics such that each weighted cost metric from the plurality of weighted cost metrics is based on a product of a respective cost metric from the plurality of cost metrics and a weighting factor associated with the respective cost metric.

10. The autonomous vehicle of claim 9, wherein estimating the action cost includes calculating a sum of the plurality of cost weighted metrics.

11. The autonomous vehicle of claim 4, wherein the processor is configured to execute instructions stored on the non-transitory computer readable medium to identify the optimal route by:
 identifying a third routing state, the third routing state including an indication of a third road segment, an indication of a third lane associated with the third road segment, and an indication of a third waypoint associated with the third lane such that the third waypoint is immediately adjacent to the first waypoint; and
 estimating an action cost representing a cost to transition from the first routing state to the third routing state.

12. The autonomous vehicle of claim 11, wherein the processor is configured to execute instructions stored on the non-transitory computer readable medium to identify the optimal route by:
 selecting the minimal action cost from among the action cost representing the cost to transition from the first routing state to the second routing state and the action cost representing the cost to transition from the first routing state to the third routing state.

13. The autonomous vehicle of claim 11, wherein the second road segment is the third road segment and the second lane differs from the third lane.

14. The autonomous vehicle of claim 4, further comprising:
 a geographic location unit, wherein the processor is configured to execute instructions stored on the non-transitory computer readable medium to identify the origin by:
 controlling the geographic location unit identify a current geographic location of the autonomous vehicle; and
 identifying a waypoint from the transportation network information, the waypoint proximal to the current geographic location.

15. The autonomous vehicle of claim 1, wherein the processor is configured to execute instructions stored on the non-transitory computer readable medium to output or store the optimal route.

16. An autonomous vehicle comprising:
 a processor configured to execute instructions stored on a non-transitory computer readable medium to:
 identify transportation network information, the transportation network information including road segment information representing a plurality of road segments, the road segment information including lane information representing at least one lane for each respective road segment, the lane information including waypoint information representing at least one waypoint for each respective lane, wherein the road segment information for at least one road segment from the plurality of road segments includes lane information representing at least two adjacent lanes,
 identify an origin,
 identify a destination,
 generate a plurality of candidate routes from the origin to the destination based on the transportation network information, wherein each route from the plurality of routes indicates a distinct combination of road segments and lanes, and wherein at least one candidate route from the plurality of candidate routes includes at least one of the adjacent lanes,
 for at least one candidate route from the plurality of candidate routes:
  identify a first routing state, the first routing state including an indication of a first road segment, an indication of a first lane associated with the first road segment, and an indication of a first waypoint associated with the first lane;
  identify a second routing state, the second routing state including an indication of a second road segment, an indication of a second lane associated with the second road segment, and an indication of a second waypoint associated with the second lane such that the second waypoint is immediately adjacent to the first waypoint; and
  generate an action cost representing a cost to transition from the first routing state to the second routing state, and
 identify an optimal route from the plurality of candidate routes, the optimal route having a minimal route cost; and
 a trajectory controller configured to operate the autonomous vehicle to travel from the origin to the destination using the optimal route.

17. The autonomous vehicle of claim 16, wherein estimating the action cost includes evaluating at least one of a distance cost metric, a duration cost metric, a fuel cost metric, or an acceptability cost metric.

18. The autonomous vehicle of claim 16, wherein the processor is configured to execute instructions stored on the non-transitory computer readable medium to:
    identify a third routing state, the third routing state including an indication of a third road segment, an indication of a third lane associated with the third road segment, and an indication of a third waypoint associated with the third lane such that the third waypoint is immediately adjacent to the first waypoint; and
    generate an action cost representing a cost to transition from the first routing state to the third routing state.

19. The autonomous vehicle of claim 18, wherein the processor is configured to execute instructions stored on the non-transitory computer readable medium to identify the optimal route by:
    selecting the minimal action cost from among the action cost representing the cost to transition from the first routing state to the second routing state and the action cost representing the cost to transition from the first routing state to the third routing state.

20. An autonomous vehicle comprising:
    a processor configured to execute instructions stored on a non-transitory computer readable medium to:
        identify transportation network information, the transportation network information including road segment information representing a plurality of road segments, the road segment information including lane information representing at least one lane for each respective road segment, the lane information including waypoint information representing at least one waypoint for each respective lane, wherein the road segment information for at least one road segment from the plurality of road segments includes lane information representing at least two adjacent lanes,
        identify an origin, identify a destination,
        generate a plurality of candidate routes from the origin to the destination based on the transportation network information, wherein each route from the plurality of routes indicates a distinct combination of road segments and lanes, and wherein at least one candidate route from the plurality of candidate routes includes at least one of the adjacent lanes,
        for at least one candidate route from the plurality of candidate routes:
            identify a first routing state, the first routing state including an indication of a first road segment, an indication of a first lane associated with the first road segment, and an indication of a first waypoint associated with the first lane;
            identify a second routing state, the second routing state including an indication of a second road segment, an indication of a second lane associated with the second road segment, and an indication of a second waypoint associated with the second lane such that the second waypoint is immediately adjacent to the first waypoint;
            identify a third routing state, the third routing state including an indication of a third road segment, an indication of a third lane associated with the third road segment, and an indication of a third waypoint associated with the third lane such that the third waypoint is immediately adjacent to the first waypoint;
            generate an action cost representing a cost to transition from the first routing state to the third routing state;
            generate an action cost representing a cost to transition from the first routing state to the second routing state; and
            select the minimal action cost from among the action cost representing the cost to transition from the first routing state to the second routing state and the action cost representing the cost to transition from the first routing state to the third routing state, and
        identify an optimal route from the plurality of candidate routes, the optimal route having a minimal route cost, based at least in part on the minimal action cost; and
    a trajectory controller configured to operate the autonomous vehicle to travel from the origin to the destination using the optimal route.

* * * * *